United States Patent [19]

Ruben

[11] 4,251,608

[45] Feb. 17, 1981

[54] LEAD-SULFURIC ACID BATTERY WITH STAINLESS STEEL OR TITANIUM GRID

[76] Inventor: Samuel Ruben, 52 Seacord Rd., New Rochelle, N.Y. 10803

[21] Appl. No.: 68,454

[22] Filed: Aug. 21, 1979

[51] Int. Cl.³ .............................................. H01M 4/73
[52] U.S. Cl. .................................. 429/205; 429/225; 429/242; 429/245
[58] Field of Search ............... 429/242, 241, 245, 233, 429/234, 225, 228, 205, 204

[56] References Cited

U.S. PATENT DOCUMENTS

| | | | |
|---|---|---|---|
| 3,099,899 | 8/1963 | Horn et al. | 429/242 X |
| 3,798,070 | 3/1974 | Ruben | 429/130 |
| 3,870,563 | 3/1975 | Ruben | 429/245 X |

*Primary Examiner*—Anthony Skapars

[57] ABSTRACT

A lead-sulfuric acid storage battery in which one or both of the grids supporting the cathodic and anodic reactants comprises a base of stainless steel or titanium having a non-porous conductive coating thereover comprising a sulfuric acid resistant resin containing finely divided conductive particles, such as micronized graphite, the sulfuric acid electrolyte preferably containing a minor amount of titanyl sulfate.

6 Claims, No Drawings

LEAD-SULFURIC ACID BATTERY WITH STAINLESS STEEL OR TITANIUM GRID

This invention relates to lead-sulfuric acid storage batteries and particularly to the metal grids which support the cathodic and anodic reactants of such batteries.

One of the limitations on the use of storage batteries to power electric vehicles has been the high weight of the supporting lead grid with a poor ratio of active to inactive grid components.

An object of this invention is to eliminate the solid lead grid and provide low weight cathode and anode reactant supports, capable of withstanding local chemical effects and anodic electrolytic corrosion, having good electrical conductivity and providing mechanical support to the reactants under cyclic operation of the cell.

A number of metals or alloys can withstand the local action of sulfuric acid, but when connected as the anode for recharging by electro-chemical conversion (in the case of lead acid cells, from lead sulfate to lead peroxide), the positive grid support either oxidizes, polarizes or dissolves or both, by electrochemical dissolution.

I have found that both stainless steel and titanium, if properly protected, can serve as a satisfactory grid or reactant support in lead-sulfuric acid batteries. These metals, when treated in the following manner, will not only be protected from chemical local ($H_2SO_4$) attack and from the electrolytic corrosion when positively charged, but anodic polarization will be avoided when they are in contact with the electrolyte or an oxidizing solid such as lead peroxide.

The stainless steel, such as #304, or titanium, preferably in the form of expanded grids are dipped in a sulfuric acid-resistant electrically conductive resin mixture, such as one composed of 30 grams of silicone varnish, 10 grams of micronized graphite and 15 grams of Xylene thinner. The coated grids are drained and air dried for 20 minutes at a temperature of 50° C. They are then baked for 6 hours at 250° C., which produces an impervious conductive non-porous layer strongly bonded to the surface of the metal. Other sulfuric acid-resistant resins and varnishes in which the graphite can be uniformly dispersed and which will form a non-porous tenacious coating on the stainless steel or titanium, such as the urethanes and vinylidene chloride or fluoride can be substituted for the silicone. The coated grids may then be electroplated in a lead fluoroborate solution, a current of 0.4 amperes per square inch being applied for 1.5 hours. The two electrodes, preferably lead plated, are then coated with cathode and anode reactant pastes.

The conductive resin coated and preferably lead plated positive grid is then further coated with a lead oxide paste, (70 grams when dry) made by mixing together and grinding 72 grams of N.L. Industries #25B (25% $Pb_3O_4$/75% PbO) and 8.0 cc 6% by volume $H_3PO_4$ (7.1 cc. 85% $H_3PO_4$/92.9 cc $H_2O$). 6.4 ml of 1.400 s.g. $H_2SO_4$ is slowly added to the mix, as well as 7 to 8 ml of $H_2O$ to make the mix more spreadable. The coated positive grids are placed in an airtight humidifying container to avoid premature drying of the coating and are stacked with separating strips of polyethylene and kept in an oven for 5 days. They are then dried in a 60° C. oven for 12 hours so that they contain less than 5% residual moisture after drying.

The conductive resin coated negative electrode grid having a superposed electroplate of lead is then further coated with 60 g (when dry) of a paste made by thoroughly mixing 72.0 g of N.L. Industries Universal Grenax (lead oxide) and 2% KK Expander, after which 6.4 ml of 1.300 s.g. $H_2SO_4$ containing 6% by volume of $H_3PO_4$ is slowly added.

The coated grids as described are then electroformed in 1.070 s.g. $H_2SO_4$ to their respective reactants, $PbO_2$ on the positive electrode and porous Pb on the negative electrode.

Preferably a gel type of sulfuric acid electrolyte is used in an encapsulated cell structure, generally as described in my U.S. Pat. No. 3,870,563. It is desirable for shelf life maintenance, to add a small amount of titanyl sulfate to the sulfuric acid electrolyte. This renders the stainless steel and titanium passive to sulfuric acid and provides protection against inadvertent exposure to this acid. A minor proportion by weight of titanyl sulfate is dissolved in the sulfuric acid, in a sufficient quantity to inhibit dissolution in the electrolyte of the stainless steel or titanium. For practical purposes 1 to 10 grams of titanyl sulfate may be added to 300 ml of acid. In a typical electrolyte, the addition of the titanyl sulfate to the sulfuric acid raises the specific gravity from 1.300 s.g. to 1.302. The gel electrolyte is made by adding 10 grams of Cab-O-Sil (fumed silica product of Cabot Corporation, Boston) to 600 ml of 1.300 s.g. $H_2SO_4$ to form a silica gel, the electrolyte being made at least 24 hours before assembly of the battery. The preferred stainless steel is of the nickel-chromium type, such as the #300 series.

In the encapsulated structure, thin sheets of unwoven glass cloth coated with the gel electrolyte are placed in contact with the positive electrodes and a 2.3 mm thick 3 mm wide polyethylene frame 9.9 cm × 10.95 cm. The frame has 3 open sections for holding the gel electrolyte which is confined within the open areas of the frame the walls of which prevent squeezing out or loss of electrolyte when the assembly is compressed and assembled into a unit. The electrolyte permeates the glass cloth spacers and is in intimate adhering contact with the electrodes. The cell assembly comprises two positive electrodes and three negative electrodes separated by the gel filled unwoven glass cloth spacers and acid gel filled frames. Sheets of untreated glass cloth adjacent to the two outer negative electrodes serve as compressible and absorbent end members. The assembly is tightly wrapped and enclosed with thin polyethylene film, completely enclosing the electrodes, and taped with adhesive polyethylene tape to close any open areas and complete the sealing of the cell. Contact tabs extend upward from the assembly, with two positive tabs at one end of the unit and three negative tabs at the opposite end. All of the separate tabs of the same polarity are connected together with bolts and nuts or spot welded.

For a 6 volt battery, 3 of the wrapped cells are assembled in a compartmentlized plastic case with connections for series operation. The units are then covered by an acid-resistant epoxy, with a silicone dipped cotton cord extending from the wrapped cell to the outside, to allow diffusion of any gas developed on overcharge.

Other types of structures may be employed, such as conventional lead-sulfuric acid storage battery structures, and the grids of this invention may be used for anode and cathode supports in primary as well as secondary cells.

I claim:

1. A grid support for anodic and cathodic reactants in lead-sulfuric acid electric current producing cells comprising a base of metal selected from the group of metals consisting of stainless steel and titanium, and an impervious conductive sulfuric acidresistant coating intimately bonded to said base, comprising a resin having finely divided conductive particles uniformely dispersed therein.

2. The grid support of claim 1 characterized in that a layer of electroplated lead is superposed over said conductive coating.

3. The grid support of claim 1 characterized in that the resin is one selected from the group consisting of silicones, urethanes, vinylidene chloride and vinylidene fluoride.

4. The grid support of claim 1 characterized in that the conductive particles comprise graphite.

5. A storage battery having an electrolyte of sulfuric acid containing a minor amount of titanyl sulfate, a grid comprising expanded stainless steel having an impervious conductive sulfuric acid-resistant coating of a resin-graphite mixture intimately bonded to its surface, a layer of lead electroplated upon said resin-graphite coating, and a cathodic reactant of lead peroxide supported on said coated grid.

6. An electric current producing cell having an electrolyte of sulfuric acid having dissolved therein a minor amount of titanyl sulfate, grid supports for the anodic and cathodic reactants of said cell, said grid supports being formed of a metal selected from the group consisting of stainless steel and titanium, an impervious conductive sulfuric-acid resistant coating intimately bonded to each of said coatings, a cathodic reactant of lead peroxide supported on one of said lead electroplated grids and an anodic reactant of porous lead on the other grid.

* * * * *